United States Patent
Fujio

(10) Patent No.: US 11,167,935 B2
(45) Date of Patent: Nov. 9, 2021

(54) TRANSPORTATION PATH DIVERTER

(71) Applicant: DAIFUKU CO., LTD., Osaka (JP)

(72) Inventor: Yoshihiko Fujio, Shiga (JP)

(73) Assignee: DAIFUKU CO., LTD., Osaka (JP)

(*) Notice: Subject to any disclaimer, the term of this patent is extended or adjusted under 35 U.S.C. 154(b) by 0 days.

(21) Appl. No.: 16/845,129

(22) Filed: Apr. 10, 2020

(65) Prior Publication Data

US 2020/0324980 A1 Oct. 15, 2020

(30) Foreign Application Priority Data

Apr. 12, 2019 (JP) .............................. JP2019-075995

(51) Int. Cl.
| | |
|---|---|
| B65G 47/64 | (2006.01) |
| B65G 15/14 | (2006.01) |
| B65G 43/08 | (2006.01) |

(52) U.S. Cl.
CPC ........... *B65G 47/647* (2013.01); *B65G 15/14* (2013.01); *B65G 43/08* (2013.01); *B65G 2201/02* (2013.01); *B65G 2203/0283* (2013.01); *B65G 2203/042* (2013.01)

(58) Field of Classification Search
CPC ..... B65G 47/647; B65G 47/644; B65G 47/78
See application file for complete search history.

(56) References Cited

U.S. PATENT DOCUMENTS

| 3,169,630 A | 2/1965 | Christiansen |
| 6,105,751 A * | 8/2000 | Jentjens ............... B65G 47/647 |
| | | 198/435 |
| 10,597,238 B2 * | 3/2020 | Schroeder ............ B65G 47/647 |

FOREIGN PATENT DOCUMENTS

| JP | 2006-131404 A | 5/2006 |
| WO | WO-2005/021410 A | 3/2005 |
| WO | WO2006/038882 A1 | 4/2006 |

OTHER PUBLICATIONS

Extended European Search Report issue in connection with corresponding European Patent Application No. 20164479.6, dated Aug. 28, 2020.
Search Report dated Mar. 9, 2021 from corresponding Singapore Appl. No. 10202002983R.

* cited by examiner

*Primary Examiner* — William R Harp
(74) *Attorney, Agent, or Firm* — Kusner & Jaffe

(57) ABSTRACT

A transportation path diverter diverts the transportation path of a conveyed article. The transportation path diverter includes an upstream-side lower diverting conveyor, a downstream-side upper diverting conveyor, a downstream-side lower diverting conveyor, a height sensor, and an article sensor. The height sensor detects the article conveyed by the upstream-side lower diverting conveyor, the article having at least a predetermined height. The article sensor detects the article transferred from the upstream-side lower diverting conveyor to the downstream-side lower diverting conveyor. A swing of the downstream-side upper diverting conveyor by a first swinging device is controlled based on the detection of the article by the height sensor and the article sensor.

4 Claims, 6 Drawing Sheets

TRANSPORTATION PATH DIVERTER

FIELD OF THE INVENTION

The present invention relates to a transportation path diverter that diverts the transportation path of a conveyed article in a facility for conveying the article.

BACKGROUND OF THE INVENTION

As a transportation path diverter that diverts the transportation path of a conveyed article in a facility for conveying the article, a transportation path diverter illustrated in Japanese Patent Laid-Open No. 2006-131404 is available. The transportation path diverter includes a main conveyor disposed on the upper stage and two sub conveyors vertically disposed in two stages. Three diverting conveyors are provided between the main conveyor and the two sub conveyors. In the transportation path diverter, the upper diverting conveyor on the upstream side and the upper diverting conveyor on the downstream side are coupled to each other via a wrapping connecting member, whereas the upper diverting conveyor on the downstream side and the lower diverting conveyor on the downstream side are coupled to each other via a link. In the transportation path diverter, the wrapping connecting member is operated so as to swing the upper diverting conveyor on the upstream side and the upper diverting conveyor on the downstream side and the swing of the upper diverting conveyor on the downstream side leads to a swing of the lower diverting conveyor on the downstream side via the link. The three diverting conveyors are swung so as to switch a transportation path from the upper main conveyor to the upper sub conveyor to a transportation path from the upper main conveyor to the lower sub conveyor. In this way, in the transportation path diverter of Japanese Patent Laid Open No. 2006-131404, the upper diverting conveyor on the downstream side and the lower diverting conveyor on the downstream side are coupled to each other via the same link, so that the transportation path of a conveyed article is diverted.

Like the transportation path diverter of Japanese Patent Laid-Open No. 2006-131404, a transportation path diverter 100 in FIGS. 5A and 5B acts as a transportation path diverter that diverts the transportation path of a conveyed article by coupling two upper and lower diverting conveyors via the same link. The transportation path diverter 100 includes a main conveyor 110 disposed on the upper stage, a main conveyor 120 disposed on the lower stage, a sub conveyor 130 disposed on the upper stage, and a sub conveyor 140 disposed on the lower stage. The transportation path diverter 100 includes four diverting conveyors (an upper diverting conveyor 150 on the upstream side, a lower diverting conveyor 160 on the upstream side, an upper diverting conveyor 170 on the downstream side, and a lower diverting conveyor 180 on the downstream side) between the main conveyor 110 and the main conveyor 120 and the sub conveyor 130 and the sub conveyor 140. In the transportation path diverter 100, the upper diverting conveyor 150 on the upstream side and the lower diverting conveyor 160 on the upstream side are coupled to each other via a swing link 190. The swing of the swing link 190 simultaneously swings the upper diverting conveyor 150 and the lower diverting conveyor 160. Moreover, the upper diverting conveyor 170 on the downstream side and the lower diverting conveyor 180 on the downstream side are coupled to each other via the same swing link 195. The swing of the swing link 195 simultaneously swings the upper diverting conveyor 170 and the lower diverting conveyor 180.

As illustrated in FIG. 5B, when the upper diverting conveyor 150 is swung downward in the transportation path diverter 100, the lower diverting conveyor 160 swings downward accordingly. Thus, a space K1 for retracting the lower diverting conveyor 160 is necessary under the horizontal position of the lower diverting conveyor 160. Moreover, in order to swing the upper diverting conveyor 170 upward in the transportation path diverter 100, it is necessary to swing the swing link 195 above the height of a swing of the upper diverting conveyor 170. Thus, a space K2 for swinging the swing link 195 is necessary above the horizontal position (see FIG. 5A) of the upper diverting conveyor 170. Since the space K1 and the space K2 are necessary in the transportation path diverter 100, if the transportation path diverter 100 is introduced at points where the existing conveyors 110, 120, 130, and 140 are provided and the spaces K1 and K2 cannot be obtained, the lower diverting conveyor 180 swinging upward and the upper diverting conveyor 150 swinging downward may cause the swing link 195 to interfere with a ceiling and the lower diverting conveyor 160 to interfere with a floor. Thus, unfortunately, the transportation path diverter 100 cannot be mounted for the existing conveyors 110, 120, 130, and 140.

Like a transportation path diverter described in International Publication No. WO 2005/021410, a diverter is developed in which two upper and lower diverting conveyors are independently swung. Thus, even if the upper diverting conveyor is swung downward, the lower diverting conveyor does not swing downward accordingly and the diverter does not interfere with a ceiling when the upper diverting conveyor is swung upward. In the transportation path diverter described in International Publication No. WO 2005/021410, the lower diverting conveyor does not swing downward according to a swing of the upper diverting conveyor. Moreover, the upper diverting conveyor does not swing upward according to a swing of the lower diverting conveyor. This eliminates the need for providing a space for retracting the lower diverting conveyor and a space for retracting the upper diverting conveyor, thereby reducing the size of the transportation path diverter. Hence, the transportation path diverter can be mounted for existing conveyors without changing the heights of the existing conveyors.

In the transportation path diverter that independently swings the two upper and lower diverting conveyors as described in International Publication No. WO 2005/021410, however, it is necessary to control swings for each of diverting conveyors 210, 220, 230, and 240 as illustrated in FIG. 6. This may complicate the control of the diverting conveyors 210, 220, 230, and 240. In the transportation of, in particular, an article 310 to an upper conveyor 250 subsequently to an article 300 (conveyed article) conveyed by the lower diverting conveyors 220 and 240, the upper diverting conveyor 230 swings, in order to convey (receive) the subsequent article 310, the upstream end of the upper diverting conveyor 230 downward while the article 300 is conveyed by the lower diverting conveyors 220 and 240. Thus, when the large article 300 is conveyed by the lower diverting conveyors 220 and 240, the upper diverting conveyor 230 swinging downward may disadvantageously crush the article 300 conveyed by the lower diverting conveyors 220 and 240.

SUMMARY OF THE INVENTION

An object of the present invention is to provide, as a transportation path diverter that conveys an article on an upstream-side conveyor to downstream-side conveyors by diverting a transportation path by means of diverting conveyors, a transportation path diverter that can be mounted without changing the heights of existing upstream-side and downstream-side conveyors and prevents a diverting conveyor from crushing a conveyed article when the transportation path of the conveyed article is diverted.

A solution to the technical problem of the present invention will be discussed below.

Specifically, a transportation path diverter of the present invention is a transportation path diverter that diverts a transportation path such that an article conveyed by an upstream-side conveyor provided on the upstream side of the transportation path is conveyed to a downstream-side upper conveyor disposed above the upstream-side conveyor on a downstream side of the transportation path and a downstream-side lower conveyor disposed below the downstream-side upper conveyor on the downstream side of the transportation path, the transportation path diverter including: an upstream-side lower diverting conveyor that is disposed downstream of the upstream-side conveyor and has a downstream side swinging around the upstream-side conveyor; a downstream-side upper diverting conveyor that is disposed above the upstream-side conveyor and the upstream-side lower diverting conveyor and upstream of the downstream-side upper conveyor and has an upstream side swinging around the downstream-side upper conveyor; a downstream-side lower diverting conveyor that is disposed below the downstream-side upper diverting conveyor and upstream of the downstream-side lower conveyor and has an upstream side swinging around the downstream-side lower conveyor; a height detector that detects a conveyed article having at least a predetermined height; and a conveyed article detector that detects an article transferred from the upstream-side lower diverting conveyor to the downstream-side lower diverting conveyor, wherein the upstream-side lower diverting conveyor, the downstream-side upper diverting conveyor, and the downstream-side lower diverting conveyor are swung by different swinging devices, and a swing of the downstream-side upper diverting conveyor by the swinging device is controlled based on the detection of the conveyed article by the height detector and the conveyed article detector.

In the configuration, the height detector and the conveyed article detector detect the article conveyed by the upstream-side lower diverting conveyor and the downstream-side lower diverting conveyor, so that a swing of the downstream-side upper diverting conveyor is controlled.

Furthermore, if the height detector detects a conveyed article, the swinging device is allowed to swing the downstream-side upper diverting conveyer only after the conveyed article detector detects the conveyed article and then the downstream-side lower diverting conveyor is driven by a predetermined amount of driving.

In the configuration, if the height detector detects a conveyed article, the downstream-side upper diverting conveyor is swung after the conveyed article detector detects the conveyed article and the article is conveyed by a predetermined distance on the downstream-side lower diverting conveyor. In this case, "after the conveyed article detector detects the conveyed article" means after "start" of the detection of the conveyed article by the conveyed article detector (after the conveyed article detector detects "conveying-direction front side" of the conveyed article) or after "completion" of the detection of the conveyed article by the conveyed article detector (after the conveyed article detector detects "conveying-direction rear side" of the conveyed article).

Moreover, if the height detector detects a conveyed article, the conveyed article detector detects the conveyed article and then the swinging device starts swinging the downstream-side upper diverting conveyor after a predetermined time.

In the configuration, if the height detector detects a conveyed article, the downstream-side upper diverting conveyor is swung at a predetermined time after the conveyed article detector detects the conveyed article. In this case, "after the conveyed article detector detects the conveyed article" means after "start" of the detection of the conveyed article by the conveyed article detector (after the conveyed article detector detects "conveying-direction front side" of the conveyed article) or after "completion" of the detection of the conveyed article by the conveyed article detector (after the conveyed article detector detects "conveying-direction rear side" of the conveyed article).

Furthermore, if the height detector does not detect a conveyed article, the swinging device starts swinging the downstream-side upper diverting conveyor in response to the detection of the conveyed article by the conveyed article detector.

In the configuration, if the height detector does not detect a conveyed article, the downstream-side upper diverting conveyor is swung after the conveyed article detector detects the conveyed article. In this case, "after the conveyed article detector detects the conveyed article" means after "start" of the detection of the conveyed article by the conveyed article detector (after the conveyed article detector detects "conveying-direction front side" of the conveyed article) or after "completion" of the detection of the conveyed article by the conveyed article detector (after the conveyed article detector detects "conveying-direction rear side" of the conveyed article).

According to the transportation path diverter of the present invention, a swing of the downstream-side upper diverting conveyor is controlled depending on the height of an article conveyed by the upstream-side lower diverting conveyor and an article transferred from the upstream-side lower diverting conveyor to the downstream-side lower diverting conveyor. Thus, the downstream-side upper diverting conveyor can be swung downward according to the size and position of an article conveyed by the upstream-side lower diverting conveyor and the downstream-side lower diverting conveyor. Therefore, even if the diverting conveyors constituting the transportation path diverter are swung by the different swinging devices, when the transportation path of the article is diverted, the article conveyed by the upstream-side lower diverting conveyor and the downstream-side lower diverting conveyor will not be crushed by the downstream-side upper diverting conveyor swinging downward.

DETAILED DESCRIPTION OF THE INVENTION

A transportation path diverter 10 according to an embodiment of the present invention will be described below.

Figure 1:
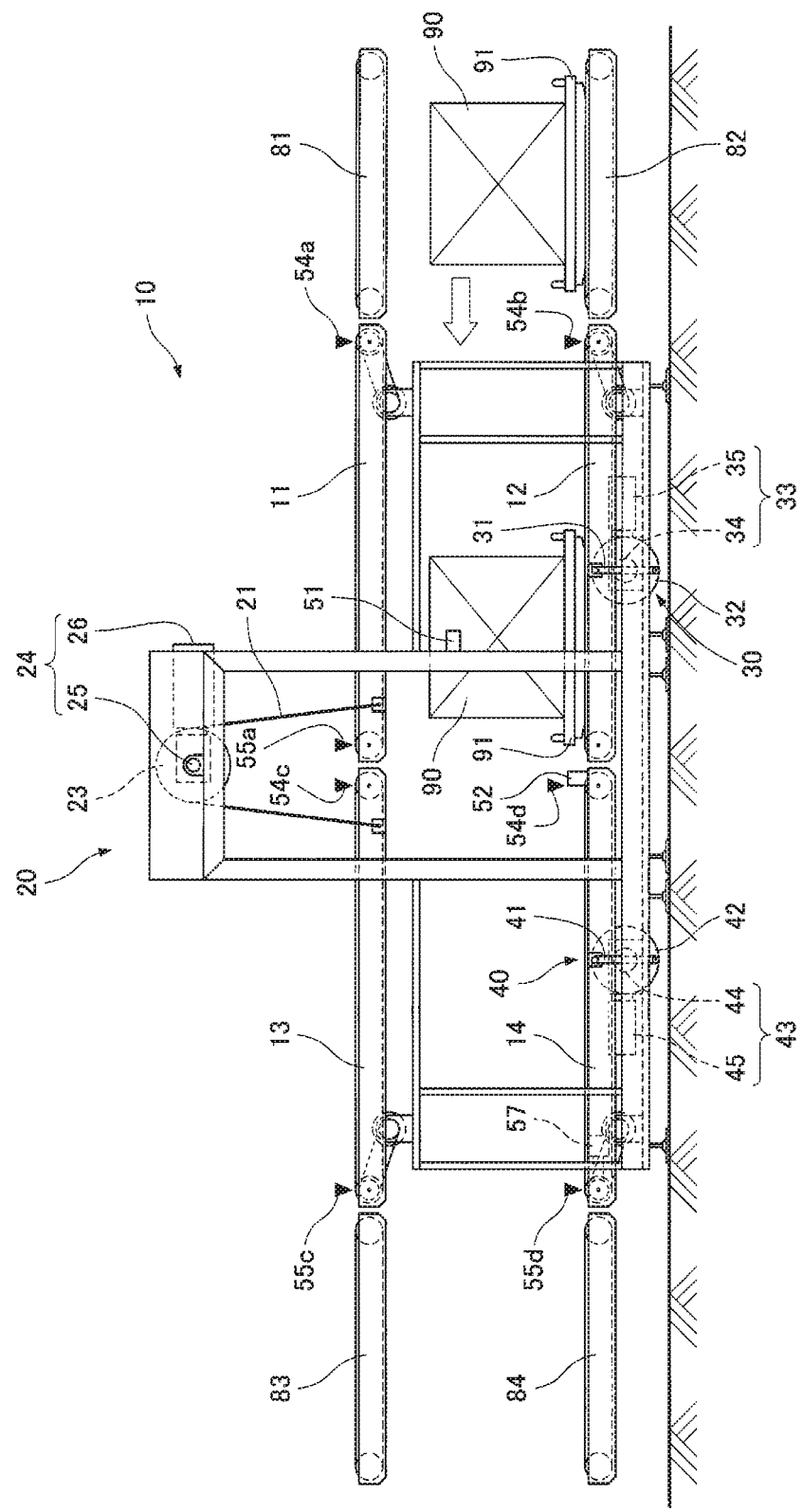
FIG. 1 is a front view of a transportation path diverter according to the present invention.

As illustrated in FIG. 1, the transportation path diverter 10 is a vertical transportation path diverter that vertically (in the height direction) diverts the transportation path of an article 90 (an example of "conveyed article") stored on a tray 91. The transportation path diverter 10 is provided in a sorting system (not illustrated) for sorting the articles 90 in, for example, an airport or a distribution center. The transportation path diverter 10 is interposed between an upstream-side upper conveyor 81 and an upstream-side lower conveyor 82 (an example of "upstream-side conveyor") that are vertically disposed in two stages and a downstream-side upper conveyor 83 and a downstream-side lower conveyor 84 that are vertically disposed in two stages.

The upstream-side upper conveyor 81 and the upstream-side lower conveyor 82 are provided on the upstream side of the transportation path of the article 90 with respect to the transportation path diverter 10. The upstream-side upper conveyor 81 and the upstream-side lower conveyor 82 convey the article 90 to the transportation path diverter 10. The upstream-side upper conveyor 81 is parallel to the upstream-side lower conveyor 82 with a predetermined clearance immediately above the upstream-side lower conveyor 82.

The downstream-side upper conveyor 83 and the downstream-side lower conveyor 84 are provided on the downstream side of the transportation path of the article 90 with respect to the transportation path diverter 10. The downstream-side upper conveyor 83 and the downstream-side lower conveyor 84 convey the article 90 conveyed from the transportation path diverter 10.

The downstream-side upper conveyor 83 is disposed at the same height as the upstream-side upper conveyor 81 and diagonally above the upstream-side lower conveyor 82 on the downstream side of the upstream-side lower conveyor 82.

The downstream-side lower conveyor 84 is disposed at the same height as the upstream-side lower conveyor 82 on the downstream side of the upstream-side lower conveyor 82. The downstream-side lower conveyor 84 is parallel to the downstream-side upper conveyor 83 with a predetermined clearance below the downstream-side upper conveyor 83.

The transportation path diverter 10 diverts the transportation path of the article 90 so as to convey the article 90 from the upstream-side upper conveyor 81 to one of the downstream-side upper conveyor 83 and the downstream-side lower conveyor 84 that are provided downstream of the transportation path diverter 10. Moreover, the transportation path diverter 10 diverts the transportation path of the article 90 so as to convey the article 90 from the upstream-side lower conveyor 82 to one of the downstream-side upper conveyor 83 and the downstream-side lower conveyor 84 that are provided downstream of the transportation path diverter 10.

In the transportation path diverter 10, the transportation path of the article 90 to the downstream-side upper conveyor 83 or the downstream-side lower conveyor 84 is diverted by switching an upstream-side upper diverting conveyor 11, the upstream-side lower diverting conveyor 12, a downstream-side upper diverting conveyor 13, and a downstream-side lower diverting conveyor 14.

The upstream-side upper diverting conveyor 11 is disposed downstream of the upstream-side upper conveyor 81. The downstream end of the upstream-side upper diverting conveyor 11 swings with its upstream end, which faces the upstream-side upper conveyor 81, as a pivot axis. The upstream-side upper diverting conveyor 11 is disposed in such a manner that the pivot axis of its swing motion is located at the same height as the upstream-side upper conveyor 81.

The upstream-side lower diverting conveyor 12 is parallel to the upstream-side upper diverting conveyor 11 with a predetermined clearance immediately below the upstream-side upper diverting conveyor 11. The upstream-side lower diverting conveyor 12 is disposed downstream of the upstream-side lower conveyor 82. The downstream end of the upstream-side lower diverting conveyor 12 swings with its upstream end, which faces the upstream-side lower conveyor 82, as a pivot axis. The upstream-side lower diverting conveyor 12 is disposed in such a manner that the pivot axis of its swing motion is located at the same height as the upstream-side lower conveyor 82.

The downstream-side upper diverting conveyor 13 is disposed upstream of the downstream-side upper conveyor 83. The downstream-side upper diverting conveyor 13 is disposed diagonally above the upstream-side lower conveyor 82 and the upstream-side lower diverting conveyor 12. The upstream end of the downstream-side upper diverting conveyor 13 swings with its downstream end, which faces the downstream-side upper conveyor 83, as a pivot axis. The downstream-side upper diverting conveyor 13 is disposed in such a manner that the pivot axis of its swing motion is located at the same height as the downstream-side upper conveyor 83.

The downstream-side lower diverting conveyor 14 is disposed upstream of the downstream-side lower conveyor 84. The downstream-side lower diverting conveyor 14 is parallel to the downstream-side upper diverting conveyor 13 with a predetermined clearance immediately below the downstream-side upper diverting conveyor 13. The upstream end of the downstream-side lower diverting conveyor 14 swings with its downstream end, which faces the downstream-side lower conveyor 84, as a pivot axis. The downstream-side lower diverting conveyor 14 is disposed in such a manner that the pivot axis of its swing motion is located at the same height as the downstream-side lower conveyor 84.

As illustrated in FIG. 1, in the transportation path diverter 10, the upstream-side upper diverting conveyor 11 and the downstream-side upper diverting conveyor 13 are laid next to each other, so that the article 90 conveyed by the upstream-side upper conveyor 81 is conveyed to the downstream-side upper conveyor 83. In the transportation path diverter 10, the upstream-side upper diverting conveyor 11 and the downstream-side lower diverting conveyor 14 swing to be laid next to each other, so that the article 90 conveyed by the upstream-side upper conveyor 81 is conveyed to the downstream-side lower conveyor 84.

Figure 3:
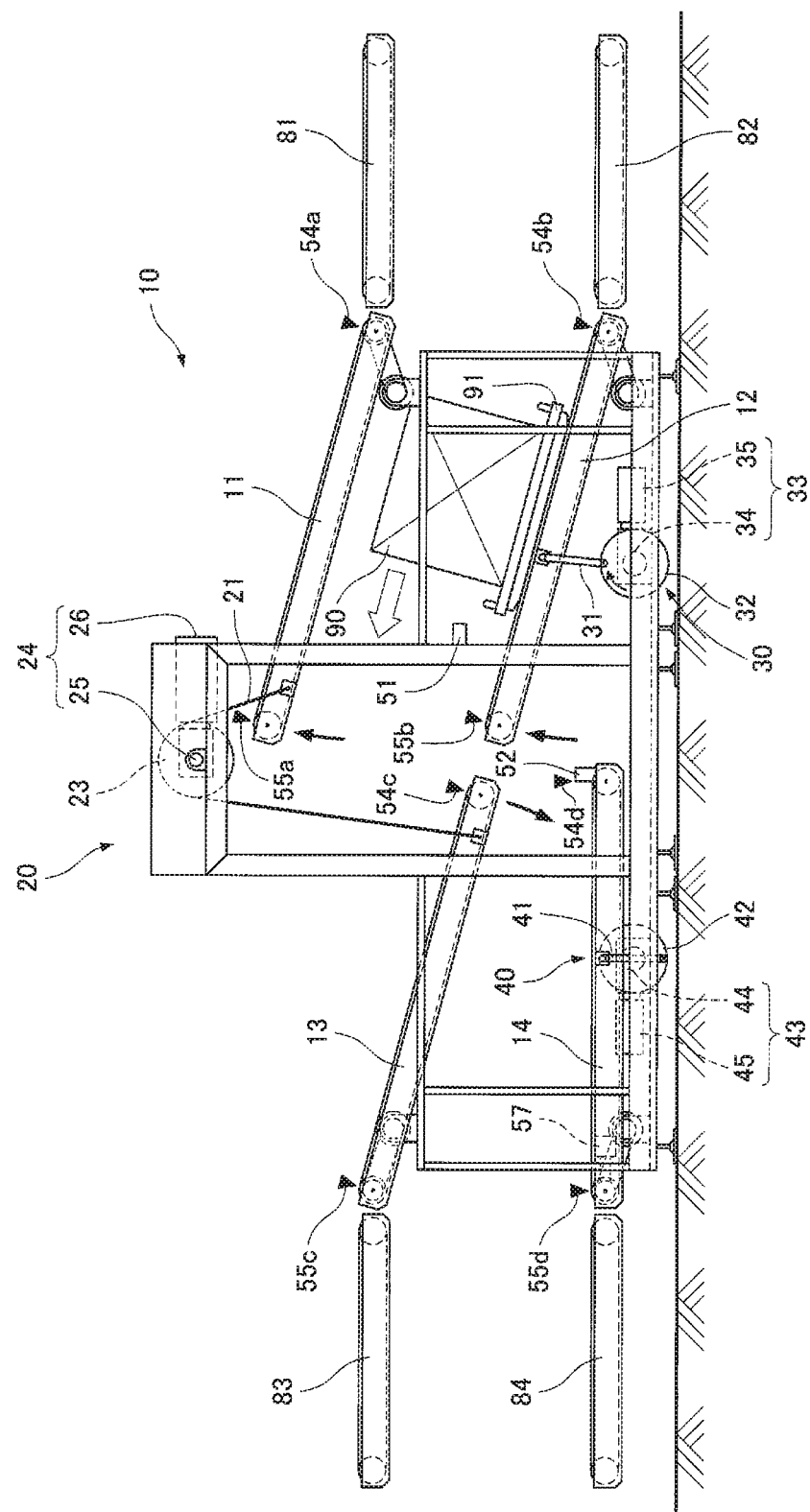
FIG. 3 is a front view of the transportation path diverter according to the present invention.

Moreover, in the transportation path diverter 10, the upstream-side lower diverting conveyor 12 and the downstream-side lower diverting conveyor 14 are laid next to each other, so that the article 90 conveyed by the upstream-side lower conveyor 82 is conveyed to the downstream-side lower conveyor 84. As illustrated in FIG. 3, in the transportation path diverter 10, the upstream-side lower diverting conveyor 12 and the downstream-side upper diverting conveyor 13 swing to be laid next to each other, so that the article 90 conveyed by the upstream-side lower conveyor 82 is conveyed to the downstream-side upper conveyor 83.

Figure 2:
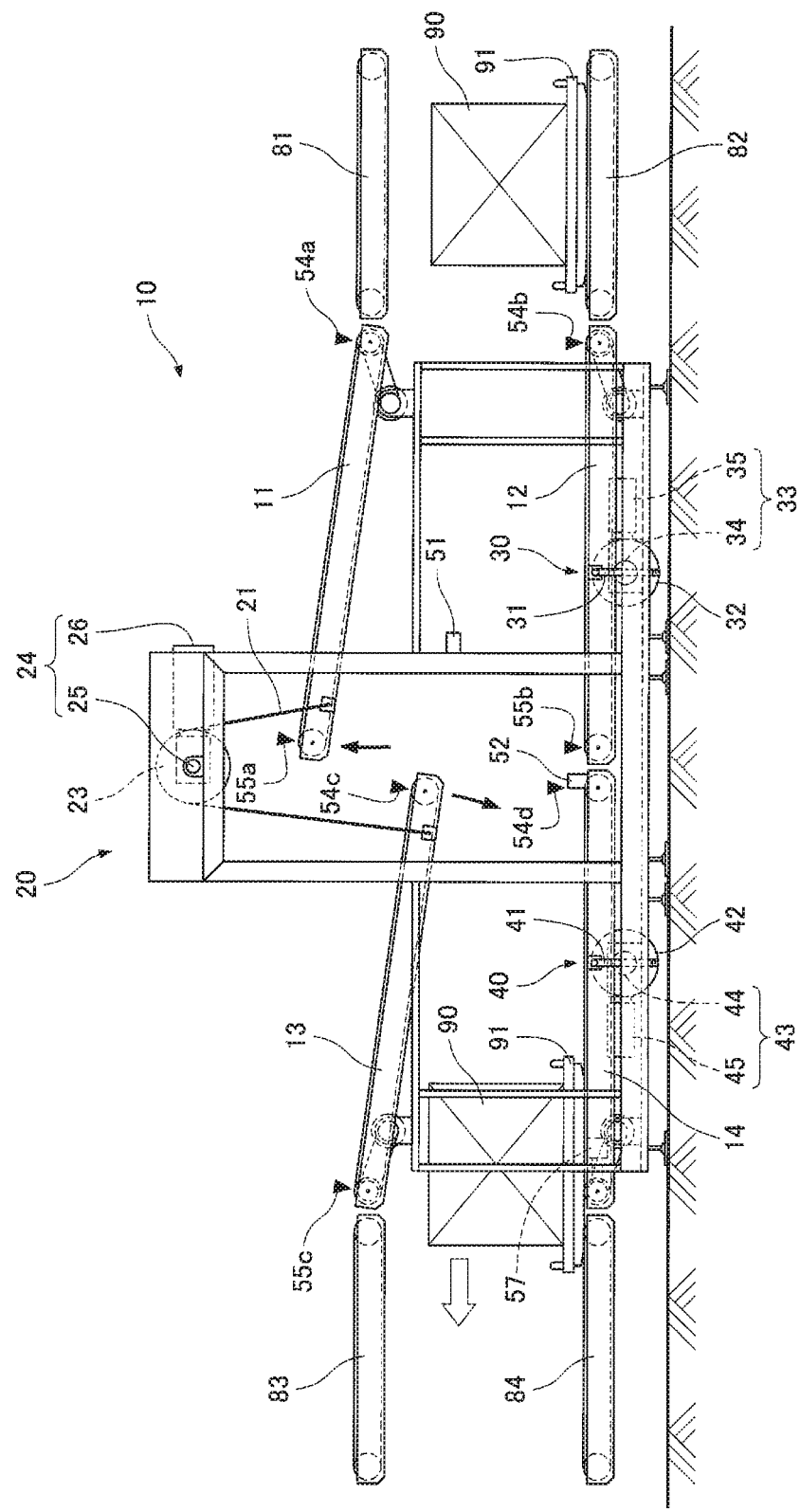
FIG. 2 is a front view of the transportation path diverter according to the present invention.

As illustrated in FIGS. 1 to 3, the upstream-side upper diverting conveyor 11 and the downstream-side upper diverting conveyor 13 are vertically swung by a first swinging device 20. The first swinging device 20 includes a roller chain 21, a sprocket 23, and a first drive unit 24 that rotates the sprocket 23.

One end of the roller chain 21 is connected to the downstream end (free end) of the upstream-side upper diverting conveyor 11. The other end of the roller chain 21 is connected to the upstream end (free end) of the downstream-side upper diverting conveyor 13. The roller chain 21 is looped over the sprocket 23.

The sprocket 23 is rotated by the first drive unit 24. The sprocket 23 rotates to draw in one end of the roller chain 21 and draws out the other end of the roller chain 21.

The first drive unit 24 comprises a first rotating shaft 25 that rotates the sprocket 23 and a first motor 26 that rotates the first rotating shaft 25.

As illustrated in FIGS. 1 to 3, the upstream-side lower diverting conveyor 12 is vertically swung by a second swinging device 30. The second swinging device 30 includes an upstream-side lower link 31 connected to the upstream-side lower diverting conveyor 12, a first cam 32 that moves the upstream-side lower link 31, and a second drive unit 33 that rotates the first cam 32.

The upstream-side lower diverting conveyor 12 is connected to one end of the upstream-side lower link 31. The first cam 32 is connected to the other end of the upstream-side lower link 31. The upstream-side lower link 31 vertically moves to swing the downstream end of the upstream-side lower diverting conveyor 12.

The first cam 32 rotates to vertically move the upstream-side lower link 31. The first cam 32 is rotated by the second drive unit 33.

The second drive unit 33 comprises a second rotating shaft 34 provided in the first cam 32 and a second motor 35 that rotates the second rotating shaft 34.

As illustrated in FIGS. 1 to 3, the downstream-side lower diverting conveyor 14 is vertically swung by a third swinging device 40. The third swinging device 40 includes a downstream-side lower link 41 connected to the downstream-side lower diverting conveyor 14, a second cam 42 that moves the downstream-side lower link 41, and a third drive unit 43 that rotates the second cam 42.

The downstream-side lower diverting conveyor 14 is connected to one end of the downstream-side lower link 41. The second cam 42 is connected to the other end of the downstream-side lower link 41. The downstream-side lower link 41 vertically moves to swing the upstream end of the downstream-side lower diverting conveyor 14.

The second cam 42 rotates to vertically move the downstream-side lower link 41. The second cam 42 is rotated by the third drive unit 43.

The third drive unit 43 comprises a third rotating shaft 44 provided in the second cam 42 and a third motor 45 that rotates the third rotating shaft 44.

In the transportation path diverter 10, the upstream-side upper diverting conveyor 11 and the downstream-side upper diverting conveyor 13 are vertically swung by the first swinging device 20. The upstream-side lower diverting conveyor 12 is vertically swung by the second swinging device 30 different from the first swinging device 20. The downstream-side lower diverting conveyor 14 is vertically swung by the third swinging device 40 that is different from the first swinging device 20 and the second swinging device 30.

As illustrated in FIGS. 1 to 3, a height sensor 51 (an example of "height detector") for detecting the height of the article 90 conveyed by the upstream-side lower diverting conveyor 12 is provided between the upstream-side upper diverting conveyor 11 and the upstream-side lower diverting conveyor 12. The height sensor 51 is provided at a predetermined height above the conveying surface of the upstream-side lower diverting conveyor 12 in a horizontal position.

An article sensor 52 (an example of "conveyed article detector") for detecting the article 90 transferred from the upstream-side lower diverting conveyor 12 to the downstream-side lower diverting conveyor 14 is provided at or near the upstream end of the downstream-side lower diverting conveyor 14.

Entrance sensors 54a, 54b, 54c, and 54d for detecting the article 90 passing through the upstream ends (entrance sides) of the diverting conveyors 11, 12, 13, and 14 are provided near the upstream ends (entrance sides) of the diverting conveyors 11, 12, 13, and 14. Exit sensors 55a, 55b, 55c, and 55d for detecting the article 90 passing through the downstream ends (exit sides) of the diverting conveyors 11, 12, 13, and 14 are provided on the downstream ends (exit sides) of the diverting conveyors 11, 12, 13, and 14. The entrance sensors 54a, 54b, 54c, and 54d and the exit sensors 55a, 55b, 55c, and 55d are provided for the diverting conveyors 11, 12, 13, and 14 so as to confirm the passage and presence of the article 90 on the diverting conveyors 11, 12, 13, and 14. This can more accurately control the swinging operations of the diverting conveyors 11, 12, 13, and 14.

A control system for the transportation path diverter 10 will be described below.

Figure 4:
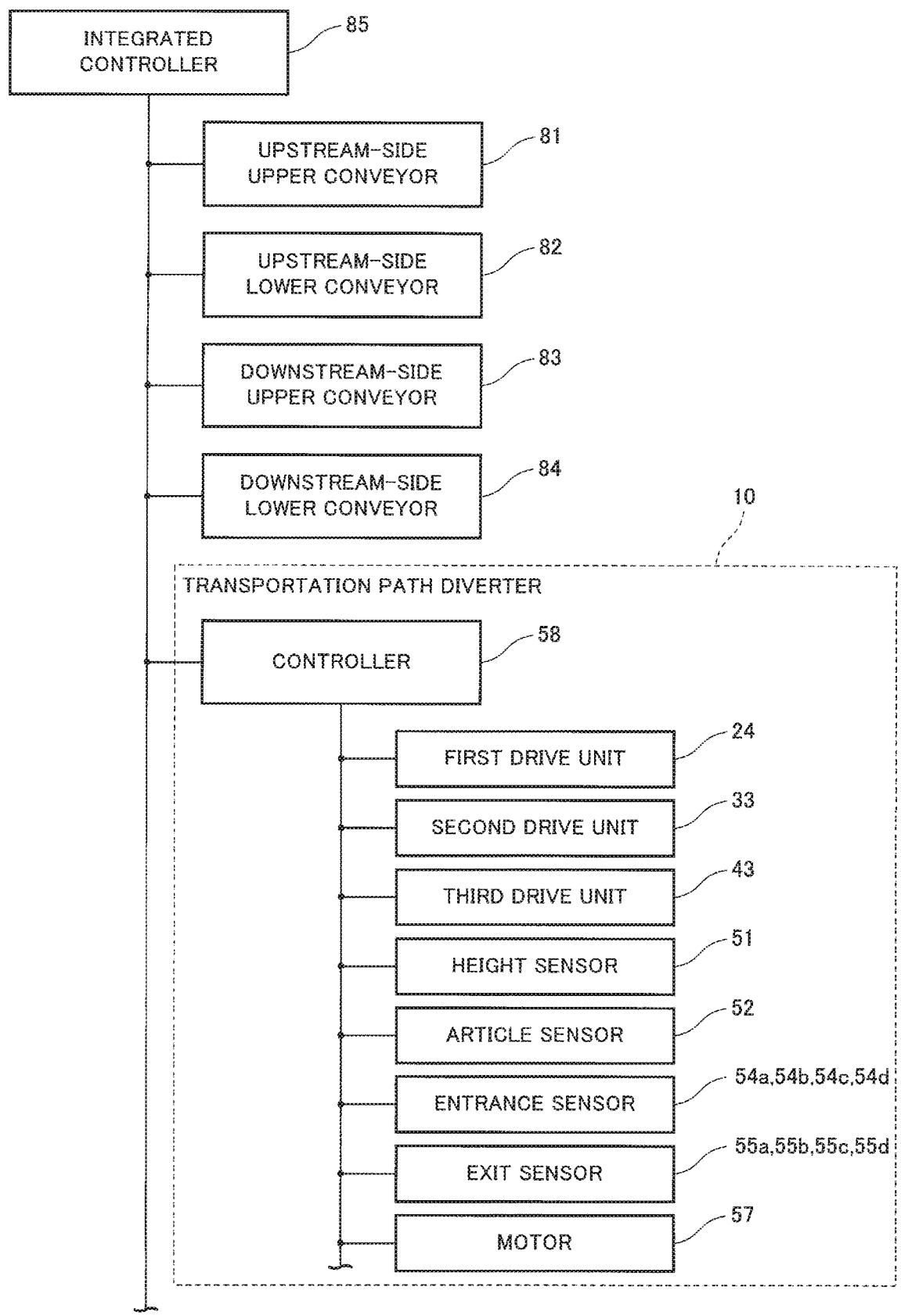
FIG. 4 is a block diagram of a control system for the transportation path diverter according to the present invention.
Figure 5A:
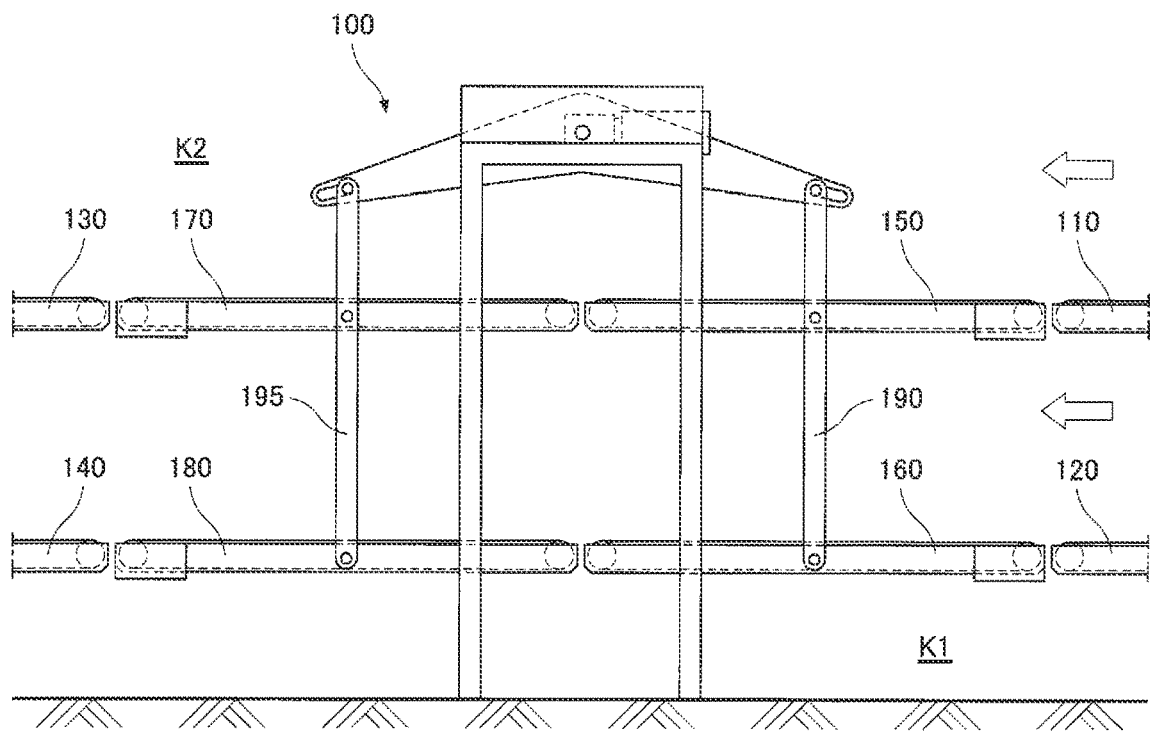
FIG. 5A is a front view of a transportation path diverter according to the related art.
Figure 5B:
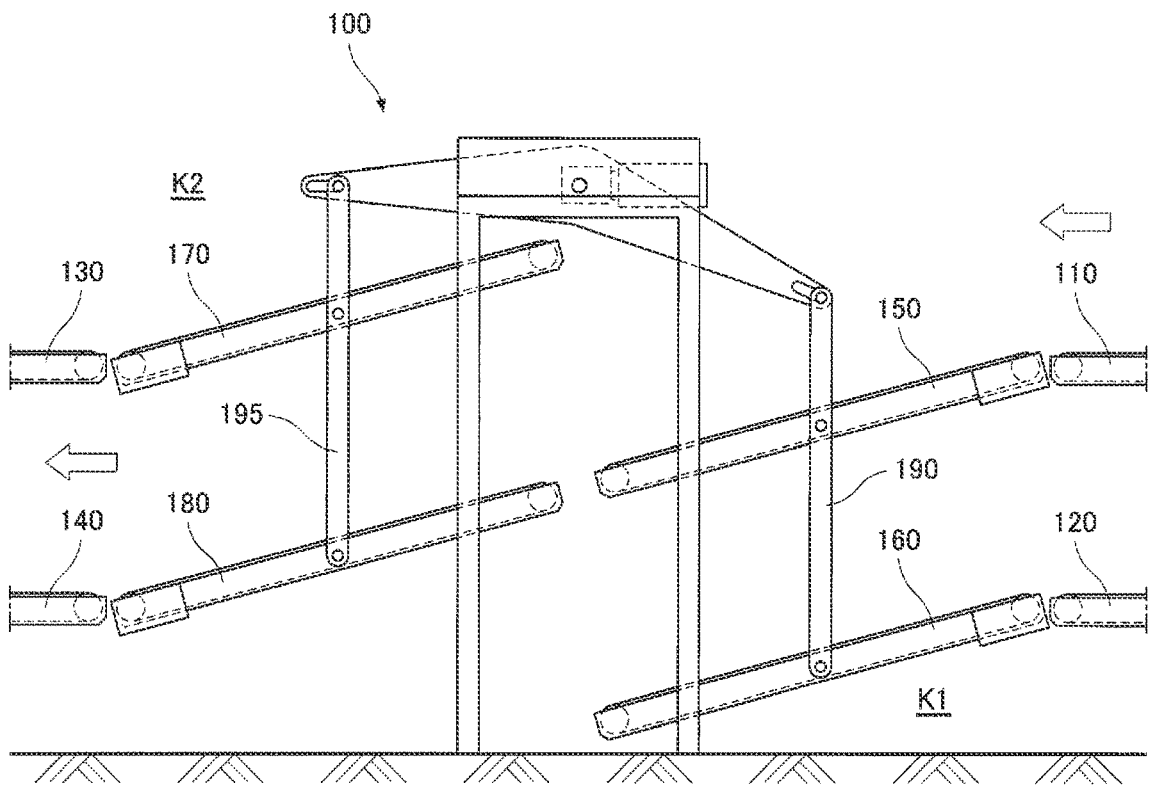
FIG. 5B is a front view of the transportation path diverter according to the related art.
Figure 6:
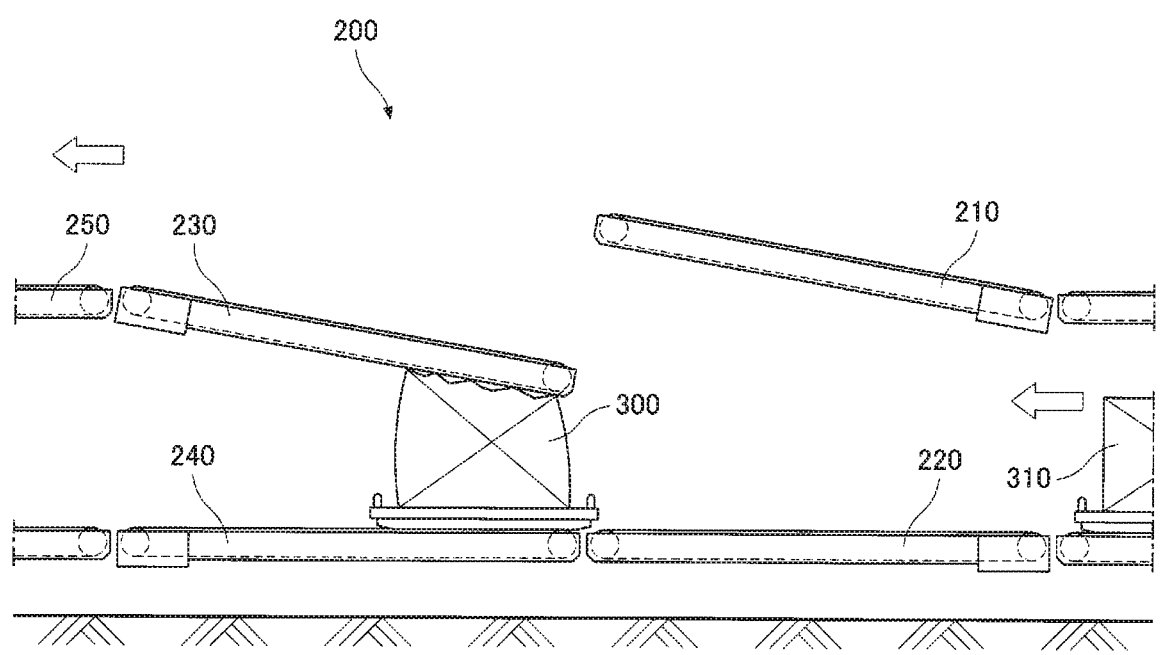
FIG. 6 is a front view of a transportation path diverter according to another example of the related art.

As illustrated in FIG. 4, the transportation path diverter 10 and the conveyors 81, 82, 83, and 84 are connected to an integrated controller 85. The operations of the transportation path diverter and the conveyors are controlled by the integrated controller 85.

The transportation path diverter 10 includes a controller 58 that controls the overall transportation path diverter 10. The controller 58 is connected to the integrated controller 85 and controls the overall transportation path diverter 10 in response to an instruction from the integrated controller 85. In the present embodiment, the overall transportation path diverter 10 is controlled by the controller 58. However, the integrated controller 85 may directly control the overall transportation path diverter 10 without the controller 58.

The first drive unit 24 of the first swinging device 20, the second drive unit 33 of the second swinging device 30, and the third drive unit 43 of the third swinging device 40 are connected to the controller 58. The controller 58 controls the driving of the first drive unit 24 so as to control the swings of the upstream-side upper diverting conveyor 11 and the downstream-side upper diverting conveyor 13 that are connected to the first drive unit 24. The controller 58 controls the driving of the second drive unit 33 so as to control the swing of the upstream-side lower diverting conveyor 12 connected to the second drive unit 33. The controller 58 controls the driving of the third drive unit 43 so as to control the swing of the downstream-side lower diverting conveyor 14 connected to the third drive unit 43.

The height sensor 51 is connected to the controller 58. The controller 58 detects whether the article 90 conveyed by the upstream-side lower diverting conveyor 12 is higher than predetermined height, based on a detection signal from the height sensor 51. The integrated controller 85 may detect the height of the article 90 through the controller 58 based on the detection signal from the height sensor 51.

The article sensor 52 is connected to the controller 58. When the article 90 is transferred from the upstream-side lower diverting conveyor 12 to the downstream-side lower diverting conveyor 14, the article sensor 52 starts detecting the article 90 (the article sensor 52 is turned on). The controller 58 detects the transfer of the article 90 from the upstream-side lower diverting conveyor 12 to the downstream-side lower diverting conveyor 14 based on the detection signal from the article sensor 52. The integrated controller 85 may detect the article 90 through the controller 58 based on the detection signal from the article sensor 52.

The entrance sensors 54a, 54b, 54c, and 54d are connected to the controller 58. When the article 90 is conveyed to the diverting conveyors 11, 12, 13, or 14, corresponding entrance sensor 54a, 54b, 54c, or 54d starts detecting the article 90 (the entrance sensors 54a, 54b, 54c, or 54d is turned on). The controller 58 detects the passage of the article 90 through the upstream ends (entrance sides) of the diverting conveyors 11, 12, 13, and 14 based on the detection signals from the entrance sensors 54a, 54b, 54c, and 54d.

The exit sensors 55a, 55b, 55c, and 55d are connected to the controller 58. When the article 90 is conveyed to the downstream sides (exit sides) of the diverting conveyors 11, 12, 13, or 14, corresponding exit sensor& 55a, 55b, 55c, or 55d starts detecting the article 90 (the exit sensors 55a, 55b, 55c, or 55d is turned on). The controller 58 detects the passage of the article 90 through the downstream ends (exit sides) of the diverting conveyors 11, 12, 13, and 14 based on the detection signals from the exit sensors 55a, 55b, 55c, and 55d.

The operation of the transportation path diverter 10 in the transportation of the article 90 from the upstream-side lower conveyor 82 to the downstream-side upper conveyor 83 will be described below.

In the transportation path diverter 10, the article 90 from the upstream-side lower conveyor 82 is conveyed to the downstream-side lower conveyor 84 or the downstream-side upper conveyor 83. The transportation path of the article 90 in the transportation path diverter 10 is determined before the article 90 is conveyed to the upstream-side lower conveyor 82. Thus, the controller 58 instructs the swinging devices 20, 30, and 40 to swing the diverting conveyors 11, 12, 13, and 14 when the article 90 is conveyed to the upstream-side lower conveyor 82.

As illustrated in FIG. 1, when the article 90 is conveyed to the upstream-side lower conveyor 82, the controller 58 checks the transportation path of the article 90 in the transportation path diverter 10. If the transportation path of the article 90 is a path from the upstream-side lower conveyor 82 to the downstream-side upper conveyor 83 (vertical path), the controller 58 determines, based on the detection signals from the height sensor 51 and the article sensor 52, whether the preceding article 90 is being conveyed on either of the upstream-side lower diverting conveyor 12 or the downstream-side lower diverting conveyor 14.

If the controller 58 does not detect the detection signals from the height sensor 51 and the article sensor 52, that is, if the preceding article 90 is not conveyed on the upstream-side lower diverting conveyor 12 and the downstream-side lower diverting conveyor 14, the controller 58 transmits instruction signals to the first drive unit 24 of the first swinging device 20 and the second drive unit 33 of the second swinging device 30. The first drive unit 24 starts swinging the downstream-side upper diverting conveyor 13 based on the instruction signal from the controller 58. Accordingly, the second drive unit 33 starts swinging the upstream-side lower diverting conveyor 12 based on the instruction signal from the controller 58. Thus, as illustrated in FIG. 3, the downstream-side upper diverting conveyor 13 swings downward and the upstream-side upper diverting conveyor 11 and the upstream-side lower diverting conveyor 12 swing upward, so that the upstream-side lower diverting conveyor 12 and the downstream-side upper diverting conveyor 13 are aligned.

If the controller 58 detects the detection signal from the height sensor 51, the controller 58 determines that the article 90 that is higher than the predetermined height is conveyed on the upstream-side lower diverting conveyor 12. In other words, the controller 58 determines that another article 90 that is higher than the predetermined height is being conveyed ahead of the article 90 arrived at the upstream-side lower conveyor 82. In this configuration, the predetermined height is the minimum height of the article 90 that, in case the downstream-side upper diverting conveyer is swung downward right after the article 90 has moved from the upstream-side lower diverting conveyer to the downstream-side lower diverting conveyer, will collide with the downstream-side upper diverting conveyer and get squashed. The predetermined height is determined by the transportation speed of the article 90 on the upstream-side lower diverting conveyor 12 and the downstream-side lower diverting conveyor 14, and the downward swing speed of the downstream-side upper diverting conveyor 13.

The article 90 detected by the height sensor 51 is transferred from the upstream-side lower diverting conveyor 12 to the downstream-side lower diverting conveyor 14. When being transferred to the downstream-side lower diverting conveyor 14, the article 90 is then detected by the article sensor 52. Specifically, when the article 90 is transferred to the downstream-side lower diverting conveyor 14, the article sensor 52 starts detecting the article 90 and transmits the detection signal to the controller 58.

Based on the detection signal from the article sensor 52, the controller 58 determines that the article 90 has been transferred from the upstream-side lower diverting conveyor 12 to the downstream-side lower diverting conveyor 14.

When receiving the detection signal from the article sensor 52, the controller 58 detects the amount of driving of the downstream-side lower diverting conveyor 14. Specifically, when the article sensor 52 starts detecting the article 90 (the article sensor 52 is turned on), the controller 58 detects the amount of driving of the downstream-side lower diverting conveyor 14. Specifically, when the article sensor 52 starts detecting the article 90, the controller 58 counts the number of pulses of a motor 57 that drives the downstream-side lower diverting conveyor 14. The controller 58 detects the amount of driving of the downstream-side lower diverting conveyor 14 by counting the number of pulses of the motor 57 for the downstream-side lower diverting conveyor 14, so that the traveling distance of the article 90 on the downstream-side lower diverting conveyor 14 is calculated.

The controller 58 counts the number of pulses until the number of pulses of the motor 57 for the downstream-side lower diverting conveyor 14 reaches a predetermined number of pulses. The predetermined number of pulses of the motor 57 for the downstream-side lower diverting conveyor 14 is the number of pulses of the motor 57 for the downstream-side lower diverting conveyor 14 when the downstream-side lower diverting conveyor 14 conveys the article 90 from a position where the article sensor 52 starts detecting the article 90 on the downstream-side lower diverting conveyor 14 to a position where the article 90 will not collide and get squashed by the downstream-side upper diverting conveyor 13 swinging downward.

The controller 58 counts the number of pulses of the motor 57 until the number of pulses reaches the predetermined number of pulses. In other words, as illustrated in FIG. 2, the controller 58 transmits the instruction signal to the first drive unit 24 so as to prevent the article 90 from being crushed in contact with the downstream-side upper diverting conveyor 13 swinging downward. The first drive unit 24 starts swinging the downstream-side upper diverting conveyor 13 based on the instruction signal from the controller 58.

When the article 90 passes through the article sensor 52 and the detection signal from the article sensor 52 becomes undetected (the detection of the article 90 by the article sensor 52 is terminated), the controller 58 transmits the instruction signal to the second drive unit 33. The second drive unit 33 starts swinging the upstream-side lower diverting conveyor 12 based on the instruction signal from the controller 58.

In this way, the controller 58 transmits the instruction signal to the first drive unit 24 and the second drive unit 33, so that as illustrated in FIG. 3, the downstream-side upper diverting conveyor 13 swings downward and the upstream-side lower diverting conveyor 12 swings upward so as to be aligned.

If the controller 58 detects only the detection signal from the article sensor 52 without detecting the detection signal from the height sensor 51, the controller 58 determines that the article 90 lower than the predetermined height is being conveyed on the downstream-side lower diverting conveyor 14. In other words, the controller 58 determines that another article 90 lower than the predetermined height is being conveyed ahead of the article 90 arrived at the upstream-side lower conveyor 82.

When the article 90 passes through the article sensor 52 and the detection signal from the article sensor 52 becomes undetected (the detection of the article 90 by the article sensor 52 is terminated), the controller 58 transmits the instruction signal to the first drive unit 24 and the second drive unit 33. The first drive unit 24 starts swinging the downstream-side upper diverting conveyor 13 based on the instruction signal from the controller 58. Accordingly, the second drive unit 33 starts swinging the upstream-side lower diverting conveyor 12 based on the instruction signal from the controller 58.

As has been discussed, if the article 90 lower than the predetermined height is conveyed on the downstream-side lower diverting conveyor 14, the controller 58 transmits the instruction signal to the first drive unit 24 and the second drive unit 33 without counting the number of pulses of the motor 57 for the downstream-side lower diverting conveyor 14 and starts swinging the upstream-side lower diverting conveyor 12 and the downstream-side upper diverting conveyor 13.

In summary, if the article 90 from the upstream-side lower conveyor 82 is to be conveyed to the downstream-side upper conveyor 83, whether the height of the preceding article 90 exceeds the predetermined height is detected by the height sensor 51.

If the preceding article 90 is higher than predetermined height, a downward swing of the downstream-side upper diverting conveyor 13 is started after the count of a predetermined number of pulses of the motor 57 for the downstream-side lower diverting conveyor 14, so that the preceding article 90 is conveyed to a position where the article 90 will not collide and get squashed by the downstream-side upper diverting conveyor 13 swinging downward.

If the article 90 is lower than the predetermined height, a downward swing of the downstream-side upper diverting conveyor 13 is started after the article 90 passes through the article sensor 52 without confirmation of the number of pulses of the motor 57 for the downstream-side lower diverting conveyor 14.

As has been discussed, according to the present embodiment, a swing of the downstream-side upper diverting conveyor 13 is controlled based on the height of the article 90 conveyed by the upstream-side lower diverting conveyor 12 and the article 90 transferred from the upstream-side lower diverting conveyor 12 to the downstream-side lower diverting conveyor 14. Thus, the downstream-side upper diverting conveyor 13 can be swung downward according to the size and position of the article 90 conveyed on the upstream-side lower diverting conveyor 12 and the downstream-side lower diverting conveyor 14. Therefore, even if the diverting conveyors 11, 12, 13, and 14 constituting the transportation path diverter 10 are swung by the different swinging devices 20, 30, and 40, when the transportation path of the article 90 is diverted, the article 90 conveyed by the upstream-side lower diverting conveyor 12 and the downstream-side lower diverting conveyor 14 is not crushed by the downstream-side upper diverting conveyor 13 swinging downward. Furthermore, the transportation path diverter 10 can be mounted between the upstream-side upper conveyor 81 and the upstream-side lower conveyor 82 and the downstream-side upper conveyor 83 and the downstream-side lower conveyor 84 without changing the heights of the conveyors 81, 82, 83, and 84.

In the present embodiment, if the height sensor 51 detects the article 90, the downstream-side lower diverting conveyor 14 is driven by a predetermined amount of driving after the article sensor 52 starts detecting the article 90, then the first drive unit 24 swings the downstream-side upper diverting conveyor 13 downward. However, the process is not particularly limited to this. The first drive unit 24 may swing the downstream-side upper diverting conveyor 13 downward at a predetermined time after the article sensor 52 starts detecting the article 90. In this case, the predetermined time is a time for the transportation of the article 90 by the downstream-side lower diverting conveyor 14 from a position where the article sensor 52 starts detecting the article 90 to a position where the article 90 will not collide and get squashed by the downstream-side upper diverting conveyor 13 swinging downward.

Specifically, the controller 58 starts measuring a time when receiving the detection signal from the article sensor 52. After the controller 58 measures a time until the predetermined time, the controller 58 transmits the instruction signal to the first drive unit 24 and the second drive unit 33. Subsequently, the first drive unit 24 and the second drive unit 33 start swinging the upstream-side lower diverting conveyor 12 and the downstream-side upper diverting conveyor 13. Thus, as illustrated in FIG. 3, the downstream-side upper diverting conveyor 13 swings downward and the upstream-side lower diverting conveyor 12 swings upward, so that the upstream-side lower diverting conveyor 12 and the downstream-side upper diverting conveyor 13 are aligned.

In the present embodiment, if the height sensor 51 detects the article 90, the downstream-side lower diverting conveyor 14 is driven by the predetermined amount of driving after the article sensor 52 starts detecting the article 90, so that the first drive unit 24 swings the downstream-side upper diverting conveyor 13 downward. However, the process is not particularly limited to this. The first drive unit 24 may swing the downstream-side upper diverting conveyor 13 downward by driving the downstream-side lower diverting conveyor 14 by the predetermined amount of driving after the completion of the detection of the article 90 by the article sensor 52 that has started the detection of the article 90 (from when the article sensor 52 is turned off). In other words, after the completion of the detection of the article 90 by the article sensor 52 that has started the detection of the article 90, the first drive unit 24 may swing the downstream-side upper diverting conveyor 13 downward in response to the detection of the amount of driving of the downstream-side lower diverting conveyor 14 by the controller 58. Furthermore, after the completion of the detection of the article 90 by the article sensor 52 that has started the detection of the article 90, the first drive unit 24 may swing the downstream-side upper diverting conveyor 13 downward after a lapse of a predetermined time.

In the present embodiment, the transportation path diverter 10 diverts the transportation path of the article 90 conveyed by the upstream-side upper conveyor 81 or the upstream-side lower conveyor 82. However, the configuration is not particularly limited to this. The transportation path diverter 10 may divert only the transportation path of the article 90 conveyed by the upstream-side lower conveyor 82. In other words, in a facility not provided with the upstream-side upper conveyor 81, the transportation path diverter 10 does not include the upstream-side upper diverting conveyor 11. In this case, the first swinging device 20 is configured to swing only the downstream-side upper diverting conveyor 13 and includes, for example, a link coupled to the downstream-side upper diverting conveyor 13, a cam for moving the link, and a drive unit for rotating the cam.

In the present embodiment, the height sensor 51 detects the height of the article 90 conveyed on the upstream-side lower diverting conveyor 12. Alternatively, the height sensor 51 may detect, for example, the height of the article 90 being transferred from the upstream-side lower diverting conveyor 12 to the downstream-side lower diverting conveyor 14. In this case, the height sensor 51 is disposed at the boundary between the upstream-side lower diverting conveyor 12 and the downstream-side lower diverting conveyor 14. Alternatively, the height sensor 51 may detect, for example, the height of the article 90 being transferred from the upstream-side lower conveyor 82 to the upstream-side lower diverting conveyor 12. In this case, the height sensor 51 is disposed at the boundary between the upstream-side lower conveyor 82 and the upstream-side lower diverting conveyor 12.

In the present embodiment, the height of the article 90 conveyed by the upstream-side lower diverting conveyor 12 is actually detected by the height sensor 51. Alternatively, a tag including information on the height of the article 90 may be attached in advance to each of the articles 90 so that the diverter can be controlled based on height information in the tag.

REFERENCE SIGNS LIST

10 transportation path diverter
12 upstream-side lower diverting conveyor
13 downstream-side upper diverting conveyor
14 downstream-side lower diverting conveyor
20 first swinging device (swinging device)
30 second swinging device (swinging device)
40 third swinging device (swinging device)
51 height sensor (height detector)
52 article sensor (conveyed article detector)
82 upstream-side lower conveyor (upstream-side conveyor)
83 downstream-side upper conveyor
84 downstream-side lower conveyor
90 article (conveyed article)

What is claimed is:

1. A transportation path diverter that diverts a transportation path such that an article conveyed by an upstream-side conveyor provided on an upstream side of the transportation path is conveyed to a downstream-side upper conveyor disposed above the upstream-side conveyor on a downstream side of the transportation path and a downstream-side lower conveyor disposed below the downstream-side upper conveyor on the downstream side of the transportation path, the transportation path diverter comprising:

an upstream-side lower diverting conveyor that is disposed downstream of the upstream-side conveyor and has a downstream side swinging around the upstream-side conveyor;

a downstream-side upper diverting conveyor that is disposed above the upstream-side conveyor and the upstream-side lower diverting conveyor and upstream of the downstream-side upper conveyor and has an upstream side swinging around the downstream-side upper conveyor;

a downstream-side lower diverting conveyor that is disposed below the downstream-side upper diverting conveyor and upstream of the downstream-side lower conveyor and has an upstream side swinging around the downstream-side lower conveyor;

a height detector that detects a conveyed article having at least a predetermined height; and a conveyed article detector that detects an article transferred from the upstream-side lower diverting conveyor to the downstream-side lower diverting conveyor, wherein a swing of the downstream-side upper diverting conveyor is controlled based on the detection of the conveyed article by the height detector and the conveyed article detector.

2. The transportation path diverter according to claim 1, wherein the upstream-side lower diverting conveyor is swung by a second swinging device, wherein the downstream-side upper diverting conveyor is swung by a first swinging device, wherein the downstream-side lower diverting conveyor is swung by a third swinging device, and wherein, if the height detector detects a conveyed article, the first swinging device is allowed to swing the downstream-side upper diverting conveyer only after the conveyed article detector detects the conveyed article and then the downstream-side lower diverting conveyor is driven by a predetermined amount of driving.

3. The transportation path diverter according to claim 1, wherein the upstream-side lower diverting conveyor is swung by a second swinging device, wherein the downstream-side upper diverting conveyor is swung by a first swinging device, wherein the downstream-side lower diverting conveyor is swung by a third swinging device, and wherein, if the height detector detects a conveyed article, the conveyed article detector detects the conveyed article and then the first swinging device starts swinging the downstream-side upper diverting conveyor after a predetermined time.

4. The transportation path diverter according to claim 1, wherein the upstream-side lower diverting conveyor is swung by a second swinging device,
- wherein the downstream-side upper diverting conveyor is swung by a first swinging device,
- wherein the downstream-side lower diverting conveyor is swung by a third swinging device, and
- wherein, if the height detector does not detect a conveyed article, the first swinging device starts swinging the downstream-side upper diverting conveyor in response to the detection of the conveyed article by the conveyed article detector.

\* \* \* \* \*